United States Patent
Majmundar et al.

(10) Patent No.: US 11,006,411 B2
(45) Date of Patent: *May 11, 2021

(54) CONCURRENT MINI-SLOT BASED AND SLOT BASED TRANSMISSIONS TO A SINGLE DEVICE

(71) Applicant: AT&T Intellectual Property I, L.P., Atlanta, GA (US)

(72) Inventors: Milap Majmundar, Austin, TX (US); Thomas Novlan, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/449,306

(22) Filed: Jun. 21, 2019

(65) Prior Publication Data

US 2019/0313408 A1    Oct. 10, 2019

Related U.S. Application Data

(63) Continuation of application No. 15/606,189, filed on May 26, 2017, now Pat. No. 10,368,350.

(51) Int. Cl.
*H04W 4/00* (2018.01)
*H04W 72/04* (2009.01)

(52) U.S. Cl.
CPC .... *H04W 72/0446* (2013.01); *H04W 72/0406* (2013.01)

(58) Field of Classification Search
None
See application file for complete search history.

(56) References Cited

U.S. PATENT DOCUMENTS

| 9,603,160 B2 | 3/2017 | Ratasuk et al. |
| 2003/0067883 A1 | 4/2003 | Azenkot et al. |

(Continued)

FOREIGN PATENT DOCUMENTS

| WO | 2016/099227 A1 | 6/2016 |
| WO | 2016/165130 A1 | 10/2016 |
| WO | 2016/171765 A1 | 10/2016 |

OTHER PUBLICATIONS

Catania et al., "The Potential of Flexible UL/DL Slot Assignment in 5G Systems", URL: http://vbn.aau.dk/files/203986242/PID1154398.pdf, Vehicular Technology Conference (VTC Fall), IEEE 80th., 2014, Retrieved on Mar. 31, 2017, 7 Pages.

(Continued)

*Primary Examiner* — Gerald A Smarth
(74) *Attorney, Agent, or Firm* — Amin, Turocy & Watson, LLP

(57) ABSTRACT

Concurrent mini-slot based and slot based transmissions to a single device are provided herein. A method can comprise transmitting, by a network device comprising a processor, first data via a first control channel indicating a slot based transmission for a device and second data via a second control channel indicating a mini-slot based transmission for the device. A first length of the slot based transmission can comprise a defined number of symbols and a second length of the mini-slot based transmission can comprise some of the defined number of symbols. The method can also comprise transmitting, by the network device, the slot based transmission and the mini-slot based transmission. The slot based transmission and the mini-slot based transmission can be logically separate transmissions that can be scheduled to be concurrent transmissions for the device.

20 Claims, 15 Drawing Sheets

(56) References Cited

U.S. PATENT DOCUMENTS

| | | | |
|---|---|---|---|
| 2007/0211657 A1* | 9/2007 | McBeath | H04W 72/0446 370/329 |
| 2010/0209105 A1 | 8/2010 | Shin et al. | |
| 2010/0214992 A1* | 8/2010 | Hart | H04L 47/801 370/329 |
| 2010/0226290 A1* | 9/2010 | Kwak | H04B 7/2615 370/278 |
| 2011/0007779 A1* | 1/2011 | Nanri | H04L 1/1893 375/133 |
| 2012/0142363 A1 | 6/2012 | Elmaleh et al. | |
| 2013/0142091 A1* | 6/2013 | Wang | H04W 72/1231 370/281 |
| 2013/0182630 A1* | 7/2013 | Yamamoto | H04J 11/0076 370/312 |
| 2014/0016574 A1 | 1/2014 | Sea et al. | |
| 2014/0105075 A1* | 4/2014 | Ahmadi | H04B 7/2656 370/280 |
| 2014/0369242 A1 | 12/2014 | Ng et al. | |
| 2014/0369289 A1 | 12/2014 | Wang et al. | |
| 2015/0318969 A1* | 11/2015 | Morioka | H04L 5/0048 370/336 |
| 2016/0044619 A1 | 2/2016 | Ryu et al. | |
| 2016/0135143 A1 | 5/2016 | Won et al. | |
| 2016/0212734 A1 | 7/2016 | He et al. | |
| 2016/0338053 A1 | 11/2016 | Park et al. | |
| 2016/0360529 A1 | 12/2016 | Lee et al. | |
| 2016/0374060 A1 | 12/2016 | Lim et al. | |
| 2016/0380684 A1* | 12/2016 | Werner | H04W 72/044 375/267 |
| 2016/0380689 A1 | 12/2016 | Sun et al. | |
| 2017/0019903 A1 | 1/2017 | Talukdar et al. | |
| 2017/0041917 A1 | 2/2017 | Agiwal et al. | |
| 2017/0048775 A1 | 2/2017 | Kim | |
| 2017/0048884 A1* | 2/2017 | Jung | H04L 5/001 |
| 2017/0127414 A1 | 5/2017 | Yi et al. | |
| 2018/0027527 A1* | 1/2018 | Vitthaladevuni | H04L 1/0003 370/330 |
| 2018/0070380 A1 | 3/2018 | Nagaraja et al. | |
| 2018/0220447 A1* | 8/2018 | Kim | H04W 72/0406 |
| 2018/0317255 A1* | 11/2018 | Um | H04W 72/1268 |

OTHER PUBLICATIONS

Downlink scheduling using slots and mini-slots. 3GPP TSG-RAN WG1 Meeting #87, Rt-1612314, Reno, USA, Nov. 14-28, 2016, Agenda Item: 7.1.4.3. http://www.3gpp.org/Itp/tsg_ran/WG1_RL 1/TSGR1_87/Docs/R1-1612314.zip. Retrieved on Mar. 31, 2017, 4 pages.

Vinh et al., "Optimized Sharable-Slot Allocation Using Multiple Channels to Reduce Data-Gathering Delay in Wireless Sensor Networks" Sensors 16.4 (2016): 505. https://www.ncbi.nlm.nih.gov/pmc/articles/PMC485101/. Retrieved on Mar. 31, 2017, 19 pages.

Non-Final Office Action received for U.S. Appl. No. 15/606,189 dated Aug. 24, 2018, 26 pages.

Notice of Allowance received for U.S. Appl. No. 15/606,189 dated Mar. 14, 2019, 48 pages.

* cited by examiner

FIG. 3A

Slot of 7 Symbols Duration

| Control 302 | Data 304$_1$ | Data 304$_2$ | Data 304$_3$ | Data 304$_4$ | Duplex Gap 306 | Control and Uplink 308 |

Slot of 14 Symbols Duration

| Control 312 | Data 314$_1$ | Data 314$_2$ | Data 314$_3$ | Data 314$_4$ | Data 314$_5$ | Data 314$_6$ | Data 314$_7$ | Data 314$_8$ | Data 314$_9$ | Data 314$_{10}$ | Data 314$_{11}$ | Duplex Gap 316 | Control and Uplink 318 |

310

| Control 302 | Data 304₁ | Mini-Slot Symbol #1 402 | Mini-Slot Symbol #2 404 | Data 304₄ | Duplex Gap 306 | Control and Uplink 308 |

← Slot of 7 Symbols Duration →

| Control 312 | Data 314₁ | Data 314₂ | Data 314₃ | Data 314₄ | Data 314₅ | Data 314₆ | Mini-Slot Symbol #1 408 | Mini-Slot Symbol #2 410 | Data 314₉ | Data 314₁₀ | Data 314₁₁ | Duplex Gap 318 | Control and Uplink 316 |

← Slot of 14 Symbols Duration →

FIG. 6A — Slot of 7 Symbols Duration

| Control 302 | Data 304$_1$ | OTAC ID1 604 | OTAC ID2 606 | Data 304$_4$ | Gap 306 | UL 308 |

FIG. 6B — Slot of 14 Symbols Duration

| Control 312 | Data 314$_1$ | Data 314$_2$ | Data 314$_3$ | Data 314$_4$ | OTAC ID1 608 | OTAC ID2 610 | Data 314$_7$ | Data 314$_8$ | Data 314$_9$ | Data 314$_{10}$ | Data 314$_{11}$ | Gap 316 | UL 318 |

FIG. 7A

Slot of 7 Symbols Duration: Control 302 | Data $304_1$ | Data $304_2$ | Gap 704 | OTAC 706 | Gap 708 | UL 308

Slot of 14 Symbols Duration: Control 312 | Data $314_1$ | Data $314_2$ | Data $314_3$ | Data $314_4$ | Data $314_5$ | Data $314_6$ | Data $314_7$ | Data $314_8$ | Data $314_9$ | Gap1 712 | OTAC 710 | Gap 714 | UL 318

Slot of 7 Symbols Duration

| Control 302 | Gap 806 | OTAC ID1 804 | Gap 808 | OTAC ID2 810 | Gap 812 | UL 206 |

Slot of 14 Symbols Duration

| Control 312 | Data 3143₁ | Data 314₂ | Data 314₃ | Data 314₄ | Data 314₅ | Data 314₆ | Data 314₇ | Gap 816 | OTAC ID1 814 | Gap 818 | OTAC ID2 820 | Gap 822 | UL 318 |

802

| Control 302 | Gap1 704 | OTAC 706 | Gap1 708 | OTAC UL 902 | Gap 904 | UL 308 |
|---|---|---|---|---|---|---|

Slot of 7 Symbols Duration

FIG. 9A

| Control 312 | Data 314₁ | Data 314₂ | Data 314₃ | Data 314₄ | Data 314₅ | Data 314₆ | Data 314₇ | Gap1 712 | OTAC 710 | Gap 714 | OTAC UL 906 | Gap 908 | UL 318 |
|---|---|---|---|---|---|---|---|---|---|---|---|---|---|

Slot of 14 Symbols Duration

CONCURRENT MINI-SLOT BASED AND SLOT BASED TRANSMISSIONS TO A SINGLE DEVICE

RELATED APPLICATION

The subject patent application is a continuation of, and claims priority to, U.S. patent application Ser. No. 15/606,189 (now U.S. Pat. No. 10,368,350), filed May 26, 2017, and entitled "CONCURRENT MINI-SLOT BASED AND SLOT BASED TRANSMISSIONS TO A SINGLE DEVICE," the entirety of which is expressly incorporated herein by reference.

TECHNICAL FIELD

This disclosure relates generally to the field of wireless communication and, more specifically, to concurrent mini-slot based and slot based transmissions to a single device.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which:

FIG. 3A illustrates an example seven-symbol duration slot in accordance with an implementation;

FIG. 3B illustrates an example fourteen-symbol duration slot, according to an implementation;

FIG. 4A illustrates an example mini-slot transmission for a slot comprising a seven symbol duration in accordance with an implementation;

FIG. 4B illustrates an example mini-slot transmission for a slot comprising a seven symbol duration in accordance with an implementation;

FIG. 6A illustrates an example non-limiting representation of a slot comprising a seven symbol duration for multiplexing data and over-the air control transmissions in accordance with one or more embodiments described herein;

FIG. 6B illustrates an example non-limiting representation of a slot comprising a fourteen symbol duration for multiplexing data and over-the air control transmissions in accordance with one or more embodiments described herein;

FIG. 7A illustrates an example non-limiting representation of a slot comprising a seven symbol duration for multiplexing data and over-the air control transmissions with non-ideal synchronization in accordance with one or more embodiments described herein;

FIG. 7B illustrates an example non-limiting representation of a slot comprising a fourteen symbol duration for multiplexing data and over-the air control transmissions with non-ideal synchronization in accordance with one or more embodiments described herein;

FIG. 8A illustrates an example non-limiting representation of a slot comprising a seven symbol duration for multiplexing data and over-the air control transmissions from multiple transmission reference points with non-ideal synchronization in accordance with one or more embodiments described herein;

FIG. 8B illustrates an example non-limiting representation of a slot comprising a fourteen symbol duration for multiplexing data and over-the air control transmissions from multiple transmission reference points with non-ideal synchronization in accordance with one or more embodiments described herein;

FIG. 9A illustrates an example non-limiting representation of a slot comprising a seven symbol duration for multiplexing data and over-the air control (downlink and uplink) with non-ideal synchronization in accordance with one or more embodiments described herein;

FIG. 9B illustrates an example non-limiting representation of a slot comprising a fourteen symbol duration for multiplexing data and over-the air control (downlink and uplink) with non-ideal synchronization in accordance with one or more embodiments described herein;

DETAILED DESCRIPTION

Figure 1:
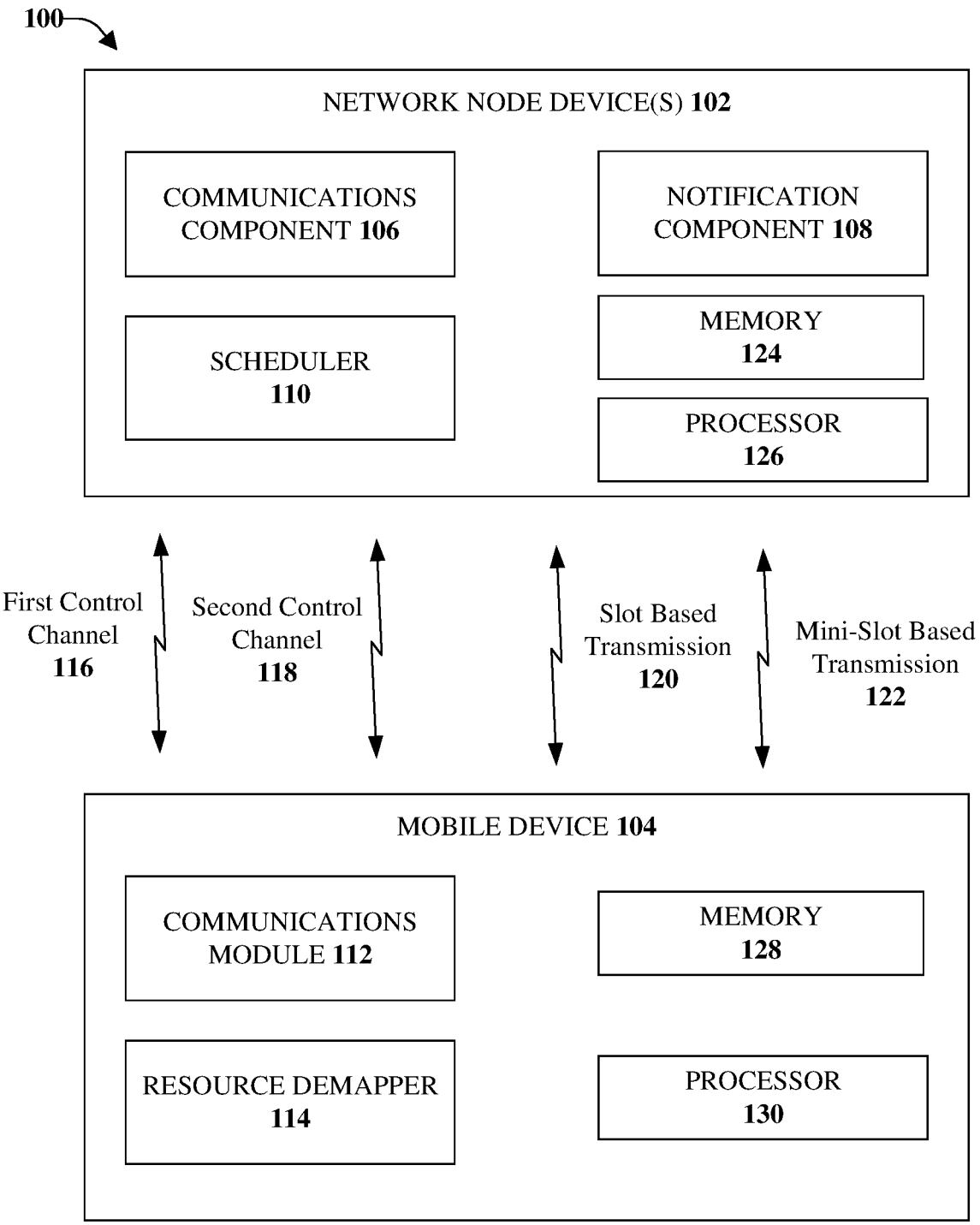
FIG. 1 illustrates an example, non-limiting communications system for facilitating mini-slot based and slot based transmissions to a single mobile device in accordance with one or more embodiments described herein.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure can be embodied in many different forms and should not be construed as limited to the example embodiments set forth herein.

Described herein are systems, methods, articles of manufacture, and other embodiments or implementations that can facilitate concurrent mini-slot based and slot based transmissions to a single device. For example, the various aspects relate to wireless communication systems and to performing concurrent mini-slot and slot transmissions to the same mobile device for 5G New Radio (NR) communications. In an example, for a 4G Long Term Evolution (LTE) design, to transmit data to/from the same mobile device for multiple different services concurrently in the same scheduling interval on the same Radio Frequency (RF) carrier comprises multiplexing data from multiple services at the Media Access Control (MAC) layer. However, in a 5G NR based wireless network, when a mobile device is configured with two different services, where one service uses mini-slot based transmissions (such as Ultra Reliable Low Latency Communications (URLLC)) while another service uses slot based transmissions (such as enhanced Mobile Broadband (eMBB)), multiplexing data from multiple services at the MAC is not sufficient. For such a scenario, there might be a reason to urgently schedule a mini-slot based transmission to the mobile device at the same time a slot based transmission is to be scheduled. The various aspects provided herein facilitate concurrent mini-slot and slot based transmissions to the same mobile device in the same slot interval, thereby reducing a potential impact to the service using slot based transmissions. Also provided herein are details related to use cases for Coordinated Multi-Point (CoMP) transmissions for latency sensitive traffic and/or to support Over-the-Air Control (OTAC) information exchange between different Transmission Reference Points (TRPs) and/or network devices (e.g., gNBs).

In one embodiment, described herein is a method that can comprise transmitting, by a network device comprising a processor, first data via a first control channel indicating a slot based transmission for a device and second data via a second control channel indicating a mini-slot based transmission for the device. A first length of the slot based transmission can comprise a defined number of symbols and a second length of the mini-slot based transmission can comprise some of the defined number of symbols. The method can also comprise transmitting, by the network device, the slot based transmission and the mini-slot based transmission. The slot based transmission and the mini-slot based transmission can be logically separate transmissions that can be scheduled to be concurrent transmissions for the device.

In an implementation, the method can comprise generating, by the network device, a first transport block indicating a first data flow scheduled for the slot based transmission, and a second transport block indicating a second data flow scheduled for the mini-slot based transmission. Further to this implementation, generating the first transport block and the second transport block can comprise generating the first transport block from first logical channels scheduled for the slot based transmission and the second transport block from second logical channels scheduled for the mini-slot based transmission. The first transport block can comprise a first field indicating the first transport block comprises the slot based transmission and the second transport block can comprise a second field indicating the second transport block comprises the mini-slot based transmission.

According to some implementations, transmitting the slot based transmission and the mini-slot based transmission can comprise scheduling, by the network device, first frequency resource elements for the slot based transmission within a time slot interval, and second frequency resource elements for the mini-slot based transmission within the time slot interval.

In accordance with some implementations, the mini-slot based transmission can be configured to preempt a symbol of the slot based transmission. In some implementations, transmitting the slot based transmission and the mini-slot based transmission can comprise implementing, by the network device, the slot based transmission prior to a scheduling of the mini-slot based transmission. Additionally or alternatively, transmitting the first data via the first control channel and the second data via the second control channel can comprise transmitting a first downlink control information related to the slot based transmission and a second downlink control information related to the mini-slot based transmission.

The method can also comprise, according to some implementations, storing, by the network device, a frequency resource corresponding to the slot based transmission. Further, the method can comprise processing, by the network device, the mini-slot based transmission based on a determination that the device comprises a single receiver chain. Processing the mini-slot based transmission can be prior to the slot based transmission being processed during a defined time slot interval.

According to another embodiment, a system can include a processor and a memory that stores executable instructions that, when executed by the processor, facilitate performance of operations. The operations can comprise sending a slot based transmission to a device and indicating to the device that a mini-slot based transmission is scheduled for the device during an interval of the slot based transmission. Further, the operations can comprise sending the mini-slot based transmission to the device during the interval of the slot based transmission. The slot based transmission can comprise a first duration occupying a defined number of symbols and the mini-slot based transmission can comprise a second duration that occupies a group of the defined number of symbols.

In some implementations, the operations can comprise suspending a transmission of the slot based transmission for the group of the defined number of symbols during which the mini-slot based transmission is sent. Further, the operations can comprise resuming the transmission of the slot based transmission after completion of the mini-slot based transmission.

According to an implementation, the operations can further comprise dividing frequency resources in a symbol between the slot based transmission and the mini-slot based transmission. In some implementations, sending the slot based transmission and sending the mini-slot based transmission can comprise using a same physical resource block of a symbol for the slot based transmission and the mini-slot based transmission. In an implementation, the mini-slot based transmission can preempt the slot based transmission in a same physical resource block.

In an alternative or additional implementation, the slot based transmission can be transmitted by a first network device. Further to this implementation, the mini-slot based transmission can be transmitted by a second network device. According to another implementation, the device is a first network device. Further to this implementation, the slot based transmission and the mini-slot based transmission can comprise respective over-the-air control information exchanged between the first network device and a second network device.

According to yet another embodiment, described herein is a machine-readable storage medium comprising executable instructions that, when executed by a processor, facilitate performance of operations. The operations can comprise generating a first transport block that comprises a first indication of a first data flow comprising a slot based transmission scheduled for a device and facilitating sending the slot based transmission to the device. The operations can also comprise generating a second transport block that comprises a second indication of a second data flow comprising a mini-slot based transmission scheduled for the device. A first length of the slot based transmission can comprise a defined number of symbols and a second length of the mini-slot based transmission can comprise a portion of the defined number of symbols. Further, the operations can comprise facilitating sending the mini-slot based transmission to the device. The slot based transmission can comprise latency supportable data and the mini-slot based transmission can comprise latency sensitive data. In addition, the slot based transmission and the mini-slot based transmission can be scheduled to be concurrent transmissions to the device.

In an implementation, the operations can comprise generating the first transport block from first logical channels scheduled for the slot based transmission. Further, the operations can comprise generating the second transport block from second logical channels scheduled for the mini-slot based transmission.

In an additional or alternative implementation, the operations can comprise scheduling first frequency resource elements for the slot based transmission within a time slot interval. Further, the operations can comprise scheduling second frequency resource elements for the mini-slot based transmission within the time slot interval. The first frequency resource elements and the second frequency resource elements can be non-overlapping frequency resources.

Referring initially to FIG. 1 illustrated is an example, non-limiting communications system 100 for facilitating mini-slot based and slot based transmissions to a single mobile device in accordance with one or more embodiments described herein. By allowing concurrent mini-slot based and slot based transmissions to a single device, transmission of critical (or very critical) low latency data to the mobile device using mini-slots can be performed while concurrently transmitting data for other services to the same mobile device using slot based transmissions. Further, the various aspects can prevent temporary interruption of slot based transmissions to a mobile device when it might be necessary to perform a mini-slot based transmission to the mobile device. Further, the various aspects can reduce impact in throughput or delay to other simultaneously configured services that a mobile device might be engaged in while receiving data from a critical low latency service that uses mini-slot transmissions.

The non-limiting communications system 100 can include a network node device 102 and a mobile device 104. The network node device 102 can be included in a group of network node devices of a wireless network. The network node device 102 can include a communications component 106, a notification component 108, and a scheduler 110. The mobile device 104 can include a communications module 112 and a resource demapper 114. Although only a single mobile device and a single network node device are shown and described, the various aspects are not limited to this implementation. Instead, multiple mobile devices and/or multiple network node devices can be included in a communications system.

The communications component 106 can transmit first data via a first control channel 116 to the mobile device 104, which can be received at the communications module 112. The first data sent via the first control channel 116 can indicate a slot based transmission for the mobile device 104. For example, the notification component 108 can set a flag or other indicator in the first control channel 116 to advise the mobile device 104 that the transmission is a slot based transmission.

Further, the communications component 106 can transmit second data via a second control channel 118 to the mobile device 104, which can be received at the communications module 112. The second data sent via the second control channel 118 can indicate a mini-slot based transmission for the mobile device 104. For example, the notification component 108 can set a flag or other indicator in the second control channel 118 to advise the mobile device 104 that the transmission is a mini-slot based transmission.

The communications component 106 can also transmit the slot based transmission 120 and/or the mini-slot based transmission 122, which can be received at the communications module 112 of the mobile device 104. The slot based transmission 120 and the mini-slot based transmission 122 are logically separate transmissions that can be scheduled to be concurrent transmissions for the mobile device 104 according to the various aspects discussed herein. For example, the scheduler 110 can schedule first frequency resource elements for the slot based transmission 120 and second frequency resource elements for the mini-slot based transmission 122. The resource demapper 114 at the mobile device 104 can determine, based on the control information received, which frequency resources belong to the slot based transmission 120 and which frequency resources belong to the mini-slot based transmission 122. Based on this determination, the resource demapper 114 can parse the resource elements appropriately based on the transmission type of the relevant resource element.

According to some implementations, the slot based transmission 120 can be implemented prior to the transmission of the second data via the second control channel 118. For example, the slot based transmission 120 can be an ongoing transmission (e.g., a long transmission) and the mini-slot based transmission 122 can be a later scheduled transmission (e.g., a short transmission) that occurs during the ongoing transmission. In an example, a first length of the slot based transmission 120 can comprise a defined number of symbols and a second length of the mini-slot based transmission 122 can comprise a portion of the defined number of symbols. According to an implementation, the defined number of symbols can be predetermined prior to the transmission. For example, a time slot can comprise seven symbols, wherein the slot based transmission 120 occupies multiple symbols of the seven symbols and the mini-slot based transmission 122 occupies at least a portion of one of the symbols. In another example, a time slot can comprise fourteen symbols, wherein the slot based transmission 120 occupies multiple symbols of the fourteen symbols and the mini-slot transmission 122 occupies at least a portion of one of the symbols. Further details relates to the respective transmissions lengths will be provided below with respect to FIGS. 3 and 4.

According to some implementations, the communications component 106 and/or the communications module 112 can facilitate communications between the network node device 102 and the mobile device 104, other mobile devices, and/or other network node devices. The communications component 106 and/or the communications module 112, for example, can be a transmitter/receiver configured to transmit to and/or receive data from the network node device 102, the mobile device 104, other network devices, and/or other mobile devices. Through the communications component 106 and/or the communications module 112, the network node device 102 and/or the mobile device 104 can concurrently transmit and receive data, can transmit and receive data at different times, or combinations thereof.

In addition, the network node device 102 can include a memory 124 and a processor 126. The memory 124 can be operatively connected to the processor 126. Further, the memory 124 can store executable instructions that, when executed by the processor 126 facilitate performance of operations. In addition, the processor 126 can be utilized to execute computer executable components stored in the memory 124.

For example, the memory 124 can store protocols associated with scheduling slot based and mini-slot based transmissions as discussed herein. Further, the memory 124 can facilitate action to control communication between the network node device 102 and the mobile device 104 such that the non-limiting communications system 100 can employ stored protocols and/or algorithms to achieve improved communications in a wireless network as described herein.

The mobile device 104 can also include a memory 128 operatively connected to a processor 130. The memory 128 can store executable instructions that, when executed by the processor 130 facilitate performance of operations and/or the processor 130 can be utilized to execute computer executable components stored in the memory 128.

The memory 128 can store protocols associated with scheduling slot based and mini-slot based transmissions as discussed herein. Further, the memory 128 can facilitate action to control communication between the mobile device 104 and the network node device 102 such that the non-limiting communications system 100 can employ stored protocols and/or algorithms to achieve improved communications in a wireless network as described herein.

The respective memories 124, 128 can store respective protocols associated with concurrent mini-slot based and slot based transmission to a single device (e.g., the mobile device 104), taking action to control communication between the network node device 102 and the mobile device 104, such that the non-limiting communications system 100 can employ stored protocols and/or algorithms to achieve improved communications in a wireless network as described herein. It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The respective processors 126, 130 can facilitate respective analysis of information related to concurrent mini-slot based and slot based transmissions to a single device in a communication network. The processors 126, 130 can be processors dedicated to analyzing and/or generating information received, processors that control one or more components of the non-limiting communications system 100, and/or processors that both analyze and generate information received and control one or more components of the non-limiting communications system 100.

Further, the term network node device (e.g., network node, network device) is used herein to refer to any type of network node serving communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., Multiple Input Multiple Output (MIMO) operations). A network node can comprise a cabinet and other protected enclosures, an antenna mast, and actual antennas. Network nodes can serve several cells, also called sectors, depending on the configuration and type of antenna. Examples of network nodes (e.g., network node device 102) can include but are not limited to: NodeB devices, base station (BS) devices, access point (AP) devices, TRPs, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

Figure 2:
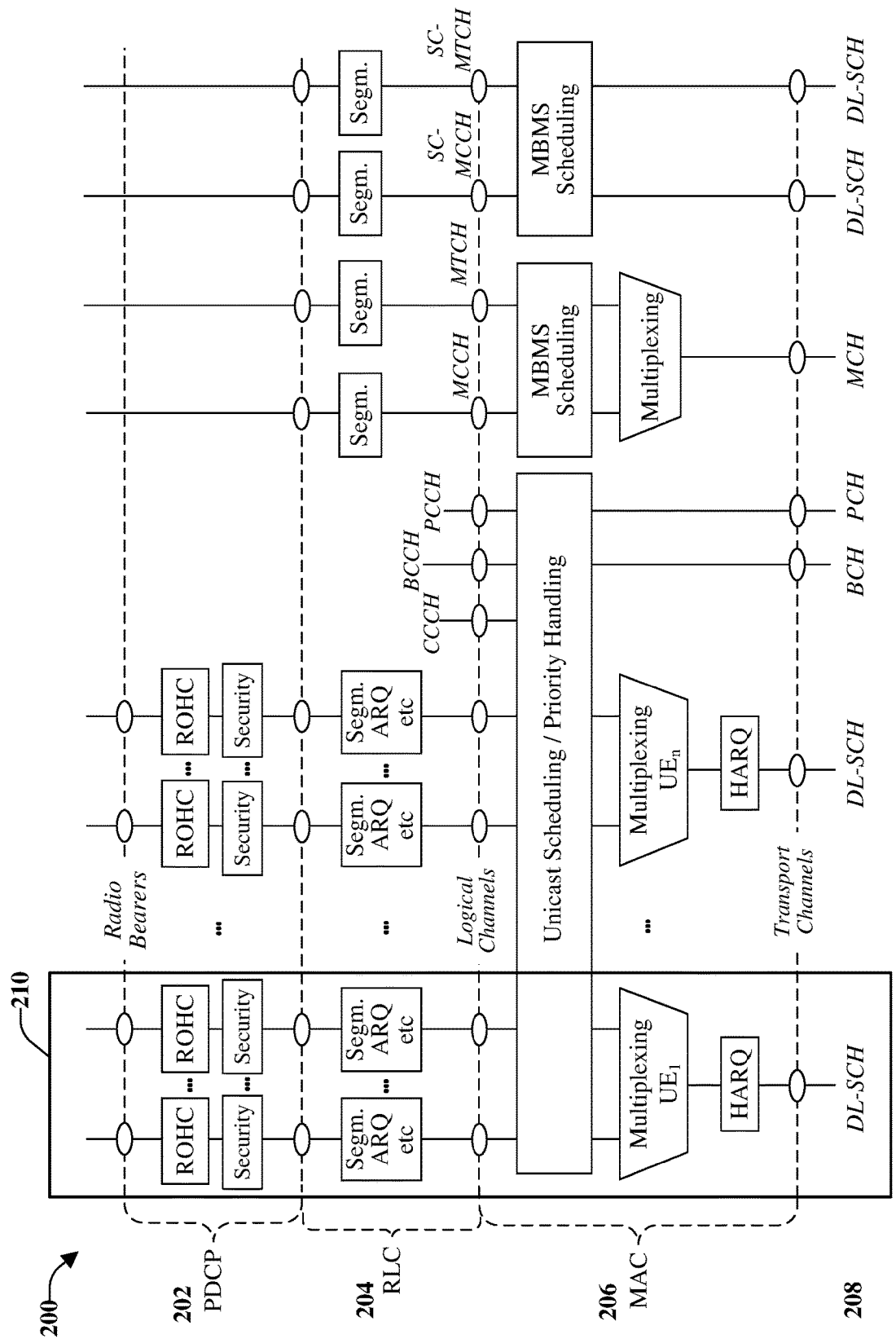
FIG. 2 illustrates a layer two structure for 4G LTE according to an implementation.

To provide further details, FIG. 2 illustrates a layer two structure 200 for 4G LTE according to an implementation. For a mobile device that is receiving a broadband data service using a slot-based transmission and concurrently is subscribed to a very ultra-low latency type of service, there could be an urgency wherein a slot-based transmission should be transmitted to the mobile device. According to the various aspects provided herein, both the slot-based transmission and the mini-slot based transmission can be concurrently transmitted to the same mobile device. Such transmissions are not possible without implementation of the disclosed aspects as will now be discussed with respect to FIG. 2.

Illustrated is a protocol stack of the layer 2 protocols. The protocol stack includes a PDCP Layer 202 (Packet Data Convergence Protocol Layer), a RLC Layer 204 (Radio Link Control Layer), and a MAC Layer 206 (Media Access Control Layer). Below the MAC Layer 206 is a physical layer 208. For service multiplexing or bearer multiplexing in the 4G and NR architectures, the different bearers or different data flows are multiplexed at the MAC Layer 206. The rectangular area 210 illustrates multiplexing for the mobile device. The multiplexing and the multiple chains going upward illustrate the different services to which the mobile device subscribes. The subscription data is multiplexed at the MAC Layer 206 and then the data is passed to the physical layer 208 in one transport block. Since there is a single transport block, the physical layer 208 is unaware that the data it is carrying comes from multiple services. Thus, to multiplex a mini-slot and a slot based transmission, the architecture of FIG. 2 cannot be utilized.

For example, in FIG. 2, the slot based transmission that was to be transmitted to the mobile device is included in the transport block already sent from the MAC layer 206 to the physical layer 208. Further, the physical layer 208 has already started transmitting the data over that slot period. Thus, if during that slot period, a mini-slot transmission comes in, there is no mechanism by which the physical layer 208 can interrupt the transmission and send the mini-slot transmission separately. This is because separate multiplexing is not possible in the architecture of FIG. 2.

Thus, in accordance with FIG. 2, there is no mechanism available to schedule a slot based transmission to a mobile while at the same time (e.g., concurrently) scheduling a mini-slot transmission to the same mobile device. This is because as explained earlier, the MAC sub-layer performs multiplexing of different logical channels before creating transport blocks for transmission by the physical layer. The physical layer is unaware of the different logical channel IDs representing the different logical channels at the MAC sub-layer. It is noted that even though the various aspects are illustrated and described based on a downlink transmission example, the various aspects can be application for concurrent mini-slot and slot transmissions on the uplink.

The various aspects provided herein relate to the case where data from multiple radio bearers is to be transmitted in the same scheduling instance. In such a case, the multiplexing of data packets from multiple radio bearers onto one physical layer transmission has been performed by the MAC layer 206. As illustrated in FIG. 2, the area marked by box 210 (corresponding to radio bearers pertaining to one mobile device), each radio bearer assigned to the mobile device is mapped onto a logical channel at the MAC layer 206. The MAC layer 206 performs multiplexing of multiple logical channels to a single transport channel.

At the time of scheduling a transmission, if there is data in the buffer for more than one logical channel, such data from multiple logical channels can be multiplexed into the same transport block for simultaneous transmission by the physical layer over one or more transmission time intervals (TTIs) over the LTE air interface. According to 4G LTE, this is the only way a mobile device can be simultaneously sent data from multiple configured services in the same scheduling instance on a single RF carrier.

In further detail, as provided herein, when a mobile device (e.g., the mobile device 104 of FIG. 1) is configured to operate with more than one radio bearer (potentially corresponding to more than one simultaneously configured data service, such as eMBB and URLLC) 5G Communication), there are various possibilities in terms of scheduling data to the mobile device for each configured radio bearer or service. In one example, packets for each configured radio bearer for a mobile device can be transmitted in a time multiplexed manner such that at a given scheduling instance data from only one radio bearer is scheduled to the mobile device. In another example, packets for each configured radio bearer for a mobile device can be transmitted simultaneously in the same scheduling instance.

The various aspects herein provide an alternative way of transmitting data to a mobile device for more than one configured service in the same scheduling instance on a single RF carrier. In an example, for 5G NR, when a mobile device is configured with two different services, one service could use mini-slot based transmissions (such as URLLC) while another service could use slot based transmissions (such as eMBB). For such a scenario, there can be a need to urgently schedule a mini-slot based transmission to the mobile device at the same time as (e.g. concurrently) a slot based transmission is to be scheduled. Although transmission of the potentially less latency sensitive slot-based transmission to the mobile device could be delayed in order to schedule the mini-slot transmission (e.g., time multiplexing), the various aspects provided herein allow simultaneous or concurrent mini-slot and slot based transmissions to the same mobile device in the same slot interval, thereby reducing potential impact to the service using slot based transmissions.

The 5G NR standard being developed in 3GPP introduces a slot duration of either 7 or 14 Orthogonal Frequency-Division Multiplexing (OFDM) symbols. Multiple slots can be aggregated to form different TTI lengths. FIG. 3A illustrates an example seven-symbol duration slot 300 in accordance with an implementation. The example of FIG. 3A relates to when a Downlink (DL) data transmission and an Uplink (UL) control information are to be transmitted in the same slot. In an example, the slot duration can be defined as follows. A first symbol 302 can be used for transmitting DL control information, followed by four symbols of data transmission, illustrated as symbols $304_1$, $304_2$, $304_3$, and $304_4$. Since during the last symbol the control signals from the mobile device should be sent to the network node device (e.g., UL), a duplex gap 306 is on the sixth symbol (e.g., there is no transmission on the sixth symbol). Further, a last symbol 308 can be used for uplink and control information.

FIG. 3B illustrates an example fourteen-symbol duration slot 310, according to an implementation. In this example, the slot duration can be defined as follows. Control information can be transmitted during a first symbol 312, followed by eleven symbols of data transmission, illustrated as symbols $314_1$, $314_2$, $314_3$, $314_4$, $314_5$, $314_6$, $314_7$, $314_8$, $314_9$, $314_{10}$, and $314_{11}$. Similar to FIG. 3A, the next symbol (e.g., the thirteenth symbol) can include a duplex gap 316 (e.g., there is no transmission on the thirteenth symbol). The last symbol 318 can be used for uplink control information.

NR introduces a mini-slot configuration, where the mini-slot length could range from one symbol to slot-length-1 symbols. Thus, a mini-slot can be a short transmission of one symbol. The mini-slot could start anywhere within a slot except the first symbol. Moreover, a mini-slot transmission from one mobile device could pre-empt the slot transmission of another mobile device. In an example, FIG. 4A illustrates a mini-slot transmission for a slot comprising a seven symbols duration 400 in accordance with an implementation. Repetitive description of like elements employed in other embodiments described herein is omitted for sake of brevity.

In the example of FIG. 4A a mini-slot transmission of two symbols is shown and described, however, in other implementations, fewer or more symbols can be utilized for a mini-slot transmission. As compared to FIG. 3A, the data transmissions at symbols $304_2$, and $304_3$ can be pre-empted by one or more mini-slot transmissions, illustrated as mini-slot symbol number one 402 and mini-slot symbol number two 404, which are for a different mobile device in the example of FIG. 4A (not the same mobile device as per the various aspects discussed herein). It is noted that the mini-slot transmissions could use the same or different numerology from the slot transmission. For example, if the implementation of FIG. 3A is being performed, and the two mini-slots are to be transmitted to the mobile device, the network node device would send the two mini-slot transmissions 402 and 404 right over the data transmission symbols. Thus, the mobile device would either receive junk information or very corrupt, high interference for those two symbols.

FIG. 4B illustrates a mini-slot transmission for a slot comprising a fourteen symbols duration 406 in accordance with an implementation. In this example, symbols $314_7$ and $314_8$ (of the embodiment of FIG. 3B) are pre-empted by mini-slot symbols number one 408 and mini-slot symbols number two 410, which are for another mobile device. Thus, during those symbols, the mobile device will receive distorted information, or an excessive amount of noise during the data transmission symbols for the mobile device that are overridden by the mini-slot transmission for another mobile device. It is noted that the position of the mini-slot transmissions in FIGS. 4A and 4B is for illustration purposes only and, during implementation, other symbols can be utilized for the mini-slot transmissions.

Figure 5:
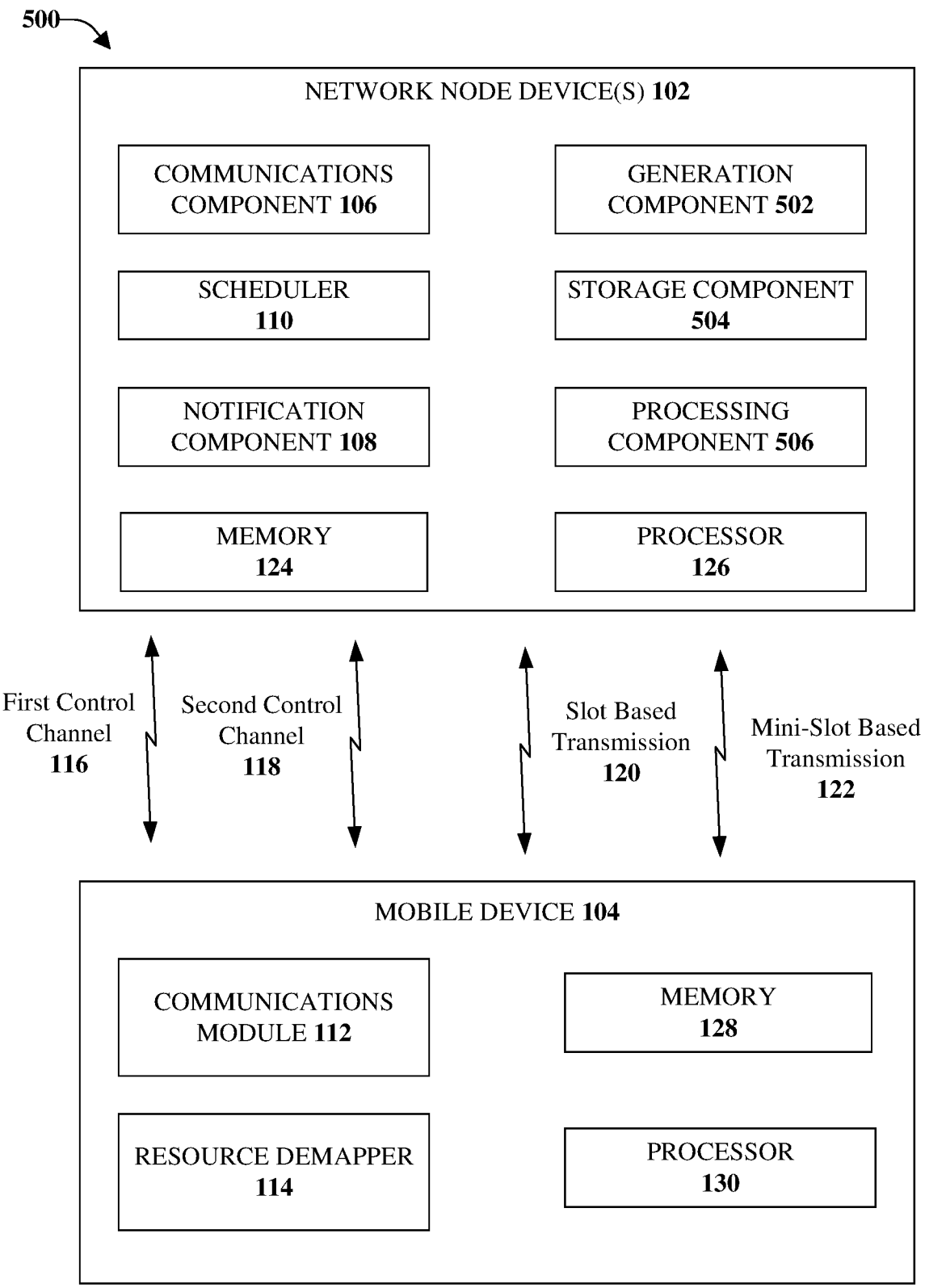
FIG. 5 illustrates an example, non-limiting system for mini-slot based and slot based transmissions to a single device in accordance with one or more embodiments described herein.

FIG. 5 illustrates an example non-limiting system 500 for mini-slot based and slot bases transmissions to a single device in accordance with one or more embodiments described herein. Repetitive description of like elements employed in other embodiments described herein is omitted for sake of brevity. The non-limiting system 500 can comprise one or more of the components and/or functionality of non-limiting communications system 100 and vice versa. As illustrated, the network node device 102 can comprise a generation component 502, a storage component 504, and a processing component 506.

The generation component 502 can generate a first transport block and a second transport block. The first transport block can indicate a first data flow scheduled for the slot based transmission. The second transport block can indicate a second data flow scheduled for the mini-slot based transmission. According to an implementation, the generation component 502 can generate the first transport block from first logical channels scheduled for the slot based transmission. Further, the generation component 502 can generate the second transport block from second logical channels scheduled for the mini-slot based transmission. The generation component 502 can include in the first transport block a first field that indicates the first transport block comprises the slot based transmission 120, as provided by the notification component 108. In addition, the generation component 502 can include in the second transport block a second field that indicates the second transport block comprises the mini-slot based transmission 122, as provided by the notification component 108.

The scheduler 110 can schedule first frequency resource elements for the slot based transmission 120 within a time slot interval. The scheduler 110 can also schedule second frequency resource elements for the mini-slot based transmission 122 within the time slot interval.

In accordance with an implementation, the communications component 106, based upon transmission of the slot based transmission and the mini-slot based transmission, can implement the slot based transmission 120 prior to a scheduling of the mini-slot based transmission 122. Thus, the slot based transmission 120 can be implemented, and can be in process, prior to the occurrence of the mini-slot based transmission 122.

According to an implementation, the communications component 106, at about the same time as transmitting the first data via the first control channel, can transmit a first downlink control information related to the slot based transmission 120. Further, the communications component 106, at about the same time as transmitting the second data via the second control channel, can transmit a second downlink control information related to the mini-slot based transmission 122. The first control channel and the second control channel can be channels configured to operate according to a fifth generation wireless network.

According to the various aspects provided herein, when performing simultaneous scheduling of mini-slot and slot transmissions to the same mobile device, the MAC sub-layer (e.g., the MAC layer 206 of FIG. 2) can separately form (e.g., via generation component 502) the transport blocks from logical channels that are to be scheduled for mini-slot and slot transmissions, rather than multiplexing data from all the logical channels (as discussed in the implementation of FIG. 2). The transport blocks corresponding to mini-slot and slot transmissions can be marked appropriately with a flag or some other such indicator (e.g., by the notification component 108) to enable the physical layer (e.g., the physical layer 208 of FIG. 2) to transmit each transport block appropriately via mini-slot and slot transmissions (e.g. via the communications component 106). According to some implementations, an additional field can be added to the MAC PDU to indicate whether it is for a mini-slot or a slot transmission (e.g., via the notification component 108).

The separate transport blocks corresponding to mini-slot and slot transmissions can be sent down to the physical layer (e.g., the physical layer 208 of FIG. 2) for transmission on the downlink shared data channel Thus, the physical layer can provide two separate control channel indications to the mobile device to indicate transmission of the two logically separate transmissions to the mobile device (e.g., via the communications component 106). This signaling could be implemented by the use of separate Downlink Control Information (DCIs), a special DCI format, or by indicating two separate allocations in the first stage of a two-stage DCI format, and so on.

The concurrent mini-slot and slot transmissions to the same mobile device can occur in a number of ways (e.g., via the communications component 106). For example, the concurrent transmission can be based on scheduling of separate frequency resource elements for the mini-slot and slot transmissions within the same time slot interval. In another example, the concurrent transmission can be based on the mini-slot transmission pre-empting certain symbols out of the slot transmission scheduled for the same mobile device (similar to FIG. 4A and/or FIG. 4B above but with both slot and mini-slot transmissions belonging to the same mobile device). In this implementation, the mini-slot transmission of the mobile device would pre-empt its own slot transmission.

At the mobile device, the resource element de-mapper 114 can read the appropriate DCI information for the two separate mini-slot versus slot transmissions. Based on the DCI information, the resource demapper 114 can de-map the correct resource elements corresponding to the mini-slot transmission and/or slot transmission for further receiver processing.

After processing the appropriate transport blocks for the mini-slot and slot transmissions, the physical layer (e.g., the physical layer 208 of FIG. 2) can pass the decoded transport blocks (MAC PDUs) up to the MAC layer (e.g., the MAC layer 206 of FIG. 2). The MAC layer reads the appropriate logical channel IDs embedded in the MAC header to appropriately pass the packets up the protocol stack to the correct radio bearers corresponding to each logical channel.

According to some implementations, the mobile device 104 might have a single receiver chain. Thus, the mobile device might only have the capability to process a single transmission at a time. Accordingly, in these implementations, some time multiplexing (and hence delay) can be introduced. This can be an implementation issue related to managing the processing of the separate transmissions within the same mobile device. Moreover, given that the mini slot transmission will usually be very small (usually one or two symbols) compared to the slot transmission (7 or 14 symbols), the slot transmission can be able to absorb any additional delay required to process the mini slot transmission first.

In the implementations where it is determined the mobile device has a single processing chain, a frequency response corresponding to the slot based transmission can be stored in the storage component 504 (and/or the memory 124 or another system component). Further, the processing component 506 (and/or the processor 126 or another system component) can process the mini-slot based transmission based on a determination that the mobile device 104 comprises a single receiver chain. The processing component 506 can process the mini-slot based transmission prior to the slot based transmission during a defined time slot interval.

FIG. 6A illustrates an example non-limiting representation of a slot 600 comprising a seven symbol duration for multiplexing data and over-the air control transmissions in accordance with one or more embodiments described herein. FIG. 6B illustrates an example non-limiting representation of a slot 602 comprising a fourteen symbol duration for multiplexing data and over-the air control transmissions in accordance with one or more embodiments described herein. Repetitive description of like elements employed in other embodiments described herein is omitted for sake of brevity.

Transmission of one or more mini-slots within a slot can be from the same or a different TRP. For example, transmitting from the same or different TRPs can support CoMP transmissions for latency sensitive traffic. Additionally or alternatively, transmission from the same or different TRPs can be used to support OTAC information exchange between different TRPs/gNBs.

In one example, the OTAC can be transmitted from the same TRP as the data transmission, which allows the multiplexing of FIG. 3A and/or FIG. 3B as described above. However, in situations when the OTAC is sent via one or more different TRPs than the slot based transmission, the multiplexing as shown in FIG. 6A and/or FIG. 6B can be used.

In this example, the slot based transmission and the mini-slot based transmission are occurring from two separate locations (e.g., the network node device 102 of FIG. 1 and another network node device, not shown) and received at the same mobile device. This process can occur for coordinated multipoint type of transmissions for latency sensitive services, where the more latency tolerance and broadband data is being sent over a slot based transmission over a first TRP while the mini-slot transmission is occurring in a coordinated fashion with a second TRP.

In FIG. 6A, two symbols, illustrated as symbols 604 and 606, are utilized by the OTAC. In a similar manner, two symbols (or more symbols), illustrated as symbols 608 and 610, for the fourteen symbol duration scheme of FIG. 6B can be utilized by the OTAC. The two or more symbols are used by the OTAC in order to receive the transmissions from the other TRPs, a different TRP, a beam-pair-link (BPL), or cell IDs corresponding to the different transmissions might need to be known at the mobile in order to appropriately map the transport blocks to the logical channels/radio bearers for the different links. The IDs can be conveyed as part of a physical control channel corresponding to OTAC payload. The control channel can be embedded in the OTAC payload or separately transmitted in a TDM/FDM manner with the OTAC payload in one or more symbols.

The schemes in FIGS. 6A and 6B assume very tight synchronization between the TRPs transmitting the slot and OTAC (mini-slot) transmissions, however this assumption might not hold in many deployment scenarios. Furthermore, the transmissions of the multiple TRPs can utilize different beamforming directions, and if analog or hybrid analog/digital beamforming is utilized at the transmitter and receiver, switching between one or more transmit and/or receive beam directions could be utilized.

In order to compensate for the resulting time delay, gap symbols might need to be introduced between the symbols utilized by the slot and those containing the OTAC (mini-slot) transmissions. FIG. 7A illustrates an example non-limiting limiting representation of a slot 700 comprising a seven symbol duration for multiplexing data and over-the air control transmissions with non-ideal synchronization in accordance with one or more embodiments described herein. FIG. 7B illustrates an example non-limiting representation of a slot 702 comprising a fourteen symbol duration for multiplexing data and over-the air control transmissions with non-ideal synchronization in accordance with one or more embodiments described herein. Repetitive description of like elements employed in other embodiments described herein is omitted for sake of brevity.

FIG. 7A and FIG. 7B illustrate examples of multiplexing between the slot based data transmission and an OTAC (mini-slot) transmission from another non-ideally synchronized TRP which should utilize a gap symbol on either side. For example, if a first TRP is implementing the slot based transmission and a second TRP is implementing the mini-slot based transmission and there is not perfect synchronization, the mobile device can receive transmissions "off" by a certain time, which can create problems. Accordingly, in the absence of an "ideal" synchronization, a gap (e.g., a period of no transmission) should be provided. For example, in FIG. 7A, a first gap 704 is before an OTAC symbol 706, followed by a second gap 708. FIG. 7B also illustrates an OTAC symbol 710 surrounded by a first gap 712 and a second gap 714. It is noted that the location of the OTAC symbols and the gaps are for purposes of describing the various aspects and the OTAC symbols and gaps can be located elsewhere within the respective transmissions.

FIG. 8A illustrates an example non-limiting limiting representation of a slot 800 comprising a seven symbol duration for multiplexing data and over-the air control transmissions from multiple TRPs with non-ideal synchronization in accordance with one or more embodiments described herein. FIG. 8B illustrates an example non-limiting representation of a slot 802 comprising a fourteen symbol duration for multiplexing data and over-the air control transmissions from multiple TRPs with non-ideal synchronization in accordance with one or more embodiments described herein. Repetitive description of like elements employed in other embodiments described herein is omitted for sake of brevity.

In the examples of FIG. 8A and FIG. 8B, two different TRPs are sending OTAC transmissions. According to this implementation, an additional gap is utilized between the OTAC symbols (e.g., to compensate for the non-ideal synchronization). For example, as illustrated in FIG. 8A, OTAC ID1 804 is surrounded by gap 806 and gap 808. Further, OTAC ID2 810 is surrounded by gap 808 and gap 812. In a similar manner for the fourteen symbol duration of FIG. 8B, OTAC ID1 814 is surrounded by gap 816 and gap 818. Further, OTAC ID2 820 is surrounded by gap 818 and gap

822. It is noted that although a particular symbol arrangement is illustrated and described with respect to the symbols of FIG. 8A and FIG. 8B, other symbols can be utilized for the OTAC ID1, the OTAC ID2, and the gaps.

Further, whether or not a gap should be utilized can depend on the network implementation and deployment scenario. The presence of one or more gap symbols can be semi-statically configured (e.g. by RRC signaling) or dynamically indicated (e.g. by cell-specific, group-common, or User Equipment (UE)-specific control signaling). Signaling can also be utilized to indicate the number of OTAC or mini-slot transmissions (and corresponding IDs) which could be multiplexing within a slot.

With reference again to FIG. 6A and FIG. 6B, according to some implementations, over-the-air control information can be provided with the disclosed aspects. As discussed above, the slot based transmission is intended for the mobile device, and there are two different network devices. Thus, there can be two (or more) network devices exchanging over the air control information between each other and these transmissions are not intended for the mobile device. The information exchanged between the network devices can be sent using mini-slot based transmissions, while the slot based transmissions are being sent to the mobile device. In this implementation, the symbols 604 and 606 and/or symbols 608 and 604 can be utilized for the over the air transmission between the two network devices, according to an implementation.

FIG. 9A illustrates an example non-limiting limiting representation of a slot 900 comprising a seven symbol duration for multiplexing data and over-the air control (downlink and uplink) with non-ideal synchronization in accordance with one or more embodiments described herein. FIG. 9B illustrates an example non-limiting representation of a slot 902 comprising a fourteen symbol duration for multiplexing data and over-the air control (downlink and uplink) with non-ideal synchronization in accordance with one or more embodiments described herein. Repetitive description of like elements employed in other embodiments described herein is omitted for sake of brevity.

In the examples of the preceding figures, focus was placed on the case where the multiplexing of slot and mini-slot transmissions is in the DL direction. However, this solution can additionally be extended to the UL direction (e.g. multiplexing UL data and control from the same or different TRP). FIG. 9A illustrates an embodiment when the OTAC comprises both a DL and an UL symbol (mini-slot) multiplexed within a slot based transmission. As illustrated, an OTAC UL 902 can be surrounded by gap 708 and GAP 904. In a similar manner for the fourteen symbol duration of FIG. 9B, an OTAC UL 906 can be surrounded by gap 714 and gap 908. It is noted that although a particular symbol arrangement is illustrated and described with respect to FIG. 9A and FIG. 9B, other symbols can be utilized for the OTAC, the OTAC UL and the gaps.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 10:
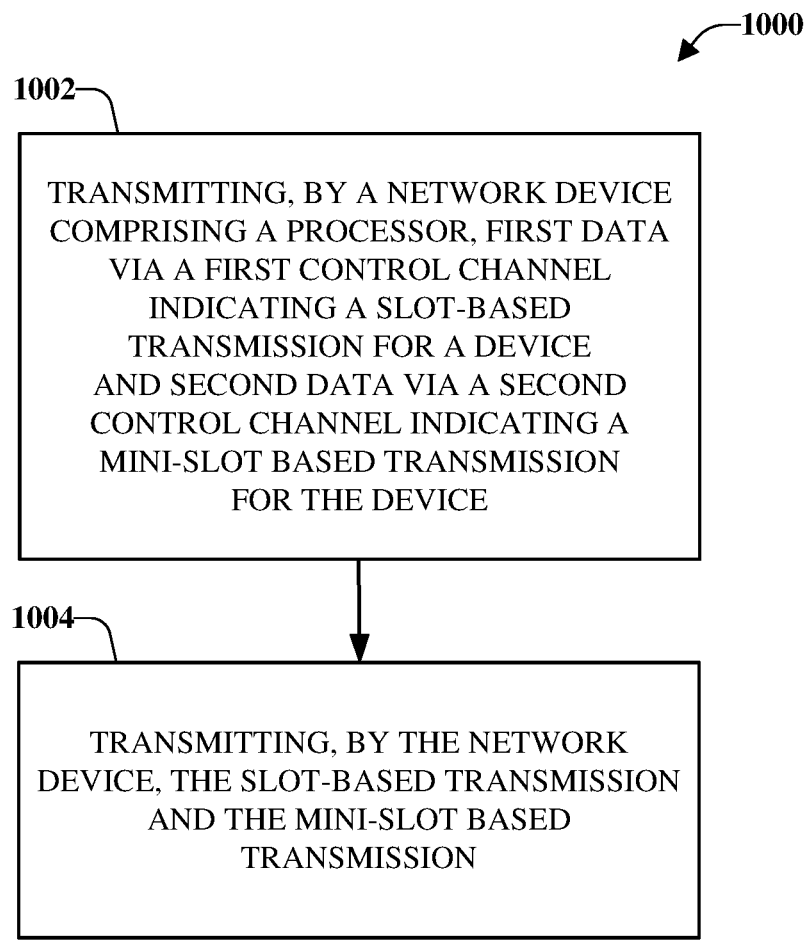
FIG. 10 illustrates a flow diagram of an example, non-limiting computer-implemented method for facilitating slot based and mini-slot based transmissions to a single mobile device in accordance with one or more embodiments described herein.

FIG. 10 illustrates a flow diagram of an example, non-limiting computer-implemented method 1000 for facilitating slot based and mini-slot based transmissions to a single mobile device in accordance with one or more embodiments described herein. The various aspects provided herein can facilitate concurrent transmission of a mini-slot based and a slot based transmission to an single mobile device. For example, the mobile device can be configured with two different services, where one service uses mini-slot based transmissions (such as URLLC) and another service uses slot based transmissions (such as eMBB). If there is a situation where concurrent scheduling of mini-slot and slot transmission to the same mobile device in the same slot interval occurs, the various aspects can enable the concurrent scheduling. Thus, the less latency sensitive slot based transmission is not delayed in order to accommodate the mini-slot transmission.

The method 1000 starts at 1002 when a network device comprising a processor transmits first data via a first control channel and second data via a second control channel. The first data sent via the first control channel can indicate a slot based transmission for a device and the second data sent via the second control channel can indicate a mini-slot based transmission for the device. Further, a first length of the slot based transmission can comprise a defined number of symbols and a second length of the mini-slot based transmission can comprise some of the defined number of symbols. In accordance with an implementation, transmitting the first data via the first control channel and the second data via the second control channel can comprise transmitting a first downlink control information related to the slot based transmission and a second downlink control information related to the mini-slot based transmission. According to some implementations, the first control channel can comprise a first control channel configured to operate according to a fifth generation wireless network communication protocol. Further to this implementation, the second control channel can comprise a second control channel configured to operate according to the fifth generation wireless network communication protocol.

At 1004, the network device can transmit the slot based transmission and the mini-slot based transmission. The slot based transmission and the mini-slot based transmission can be logically separate transmissions that can be scheduled to be concurrent transmissions for the device. In an example, the mini-slot based transmission can be configured to preempt a symbol of the slot based transmission. In accordance with an implementation, transmitting the slot based transmission and the mini-slot based transmission can comprise implementing, by the network device, the slot based transmission prior to a scheduling of the mini-slot based transmission.

According to some implementations, transmitting the slot based transmission and the mini-slot based transmission can comprise scheduling, by the network device, first frequency resource elements for the slot based transmission within a time slot interval, and second frequency resource elements for the mini-slot based transmission within the time slot interval.

Figure 11:
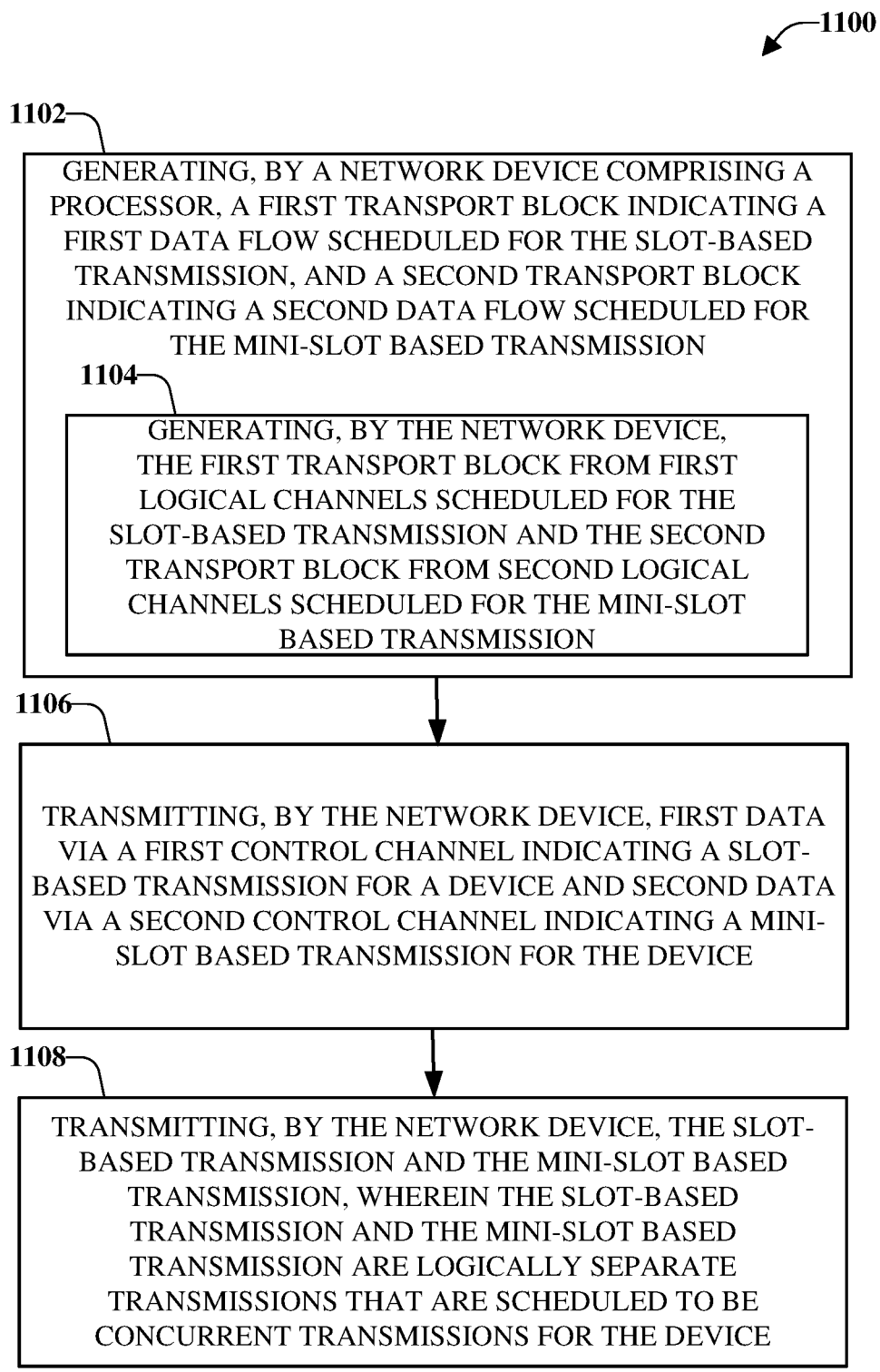
FIG. 11 illustrates a flow diagram of an example, non-limiting computer-implemented method for enabling concurrent slot based and mini-slot based transmissions to a single mobile device in accordance with one or more embodiments described herein.

FIG. 11 illustrates a flow diagram of an example, non-limiting computer-implemented method 1100 for enabling concurrent slot based and mini-slot based transmissions to a single mobile device in accordance with one or more embodiments described herein. At 1102, a network device comprising a processor can generate a first transport block and a second transport block. The first transport block can indicate a first data flow scheduled for the slot based transmission. The second transport block can indicate a second data flow scheduled for the mini-slot based transmission.

According to some implementations, generating the first transport block and the second transport block can include, at 1104, generating the first transport block from first logical channels scheduled for the slot based transmission and the second transport block from second logical channels scheduled for the mini-slot based transmission.

The method 1100 continues, at 1106, when the network device, transmits first data via a first control channel and second data via a second control channel to the mobile device. Further, at 1108, the slot based transmission and the mini-slot based transmission can be transmitted. It is noted that the first data via the first control channel can be transmitted earlier in time than the second data via the second control channel. For example, the first transport block can be transmitted and, thereafter, the slot based transmission can be sent. During a transmission of the slot based transmission, the second data via the second control channel can be transmitted to the mobile device, and, thereafter, the mini-slot based transmission can be sent.

According to some implementations, the first transport block can comprise a first field indicating the first transport block comprises the slot based transmission. Further to this implementation, the second transport block can comprise a second field indicating the second transport block comprises the mini-slot based transmission.

Figure 12:
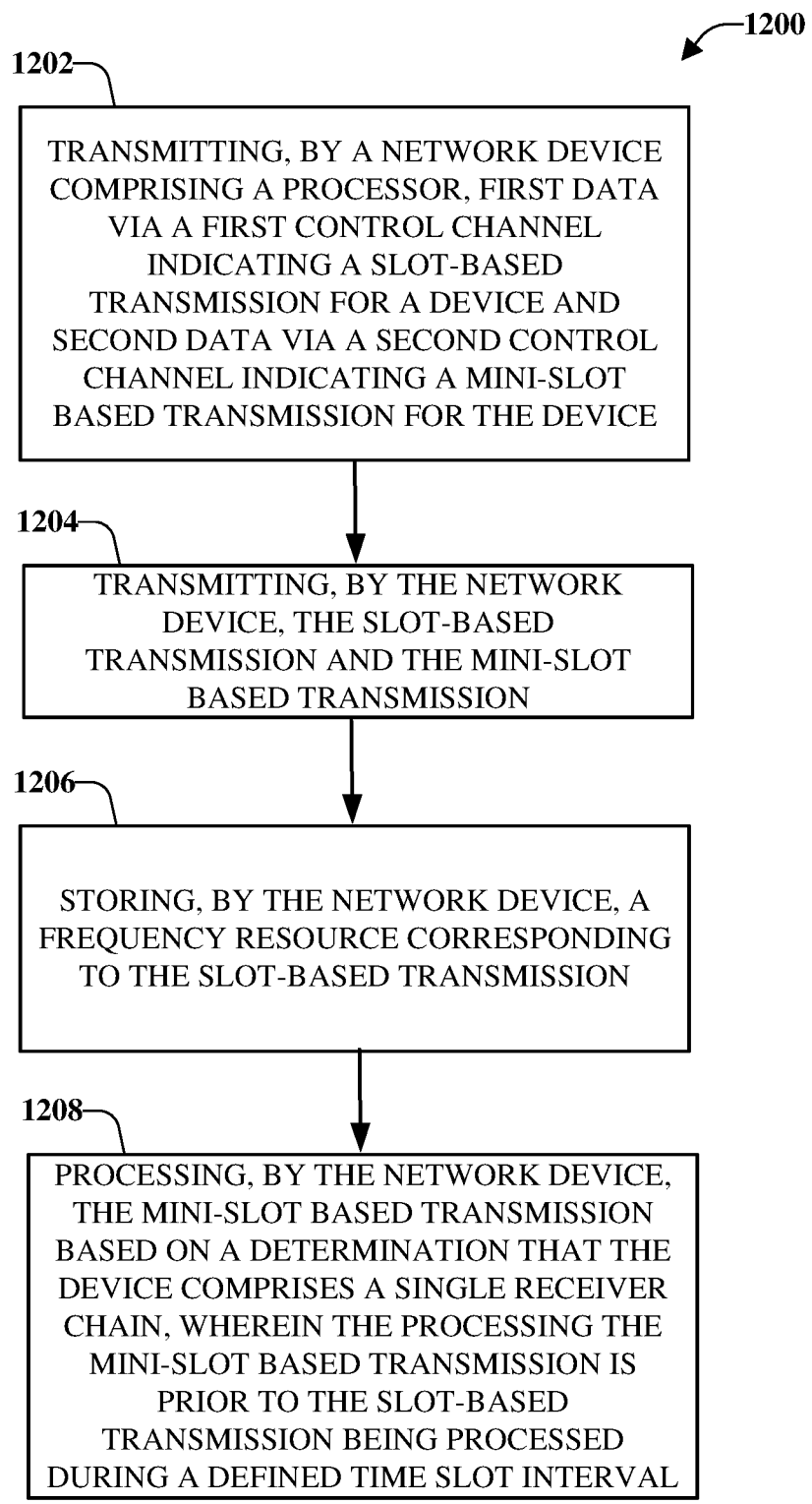
FIG. 12 illustrates a flow diagram of an example, non-limiting computer-implemented method for enabling concurrent slot based and mini-slot based transmissions to a single mobile device based on a determination that the mobile device comprises a single receiver chain in accordance with one or more embodiments described herein.

FIG. 12 illustrates a flow diagram of an example, non-limiting computer-implemented method 1200 for enabling concurrent slot based and mini-slot based transmissions to a single mobile device based on a determination that the mobile device comprises a single receiver chain in accordance with one or more embodiments described herein. The method 1200 starts at 1202 when a network device comprising a processor transmits first data via a first control channel indicating a slot based transmission for a device and second data via a second control channel indicating a mini-slot based transmission for the device. At 1204, the network device can transmit the slot based transmission and the mini-slot based transmission. Based on a determination that the mobile device comprises a single receiver chain, the method 1200 can include, at 1206, storing, by the network device, a frequency resource corresponding to the slot based transmission. Further, at 1208, the network device can process the mini-slot based transmission based on a determination that the device comprises a single receiver chain, wherein the processing the mini-slot based transmission is prior to the slot based transmission being processed during a defined time slot interval.

Figure 13:
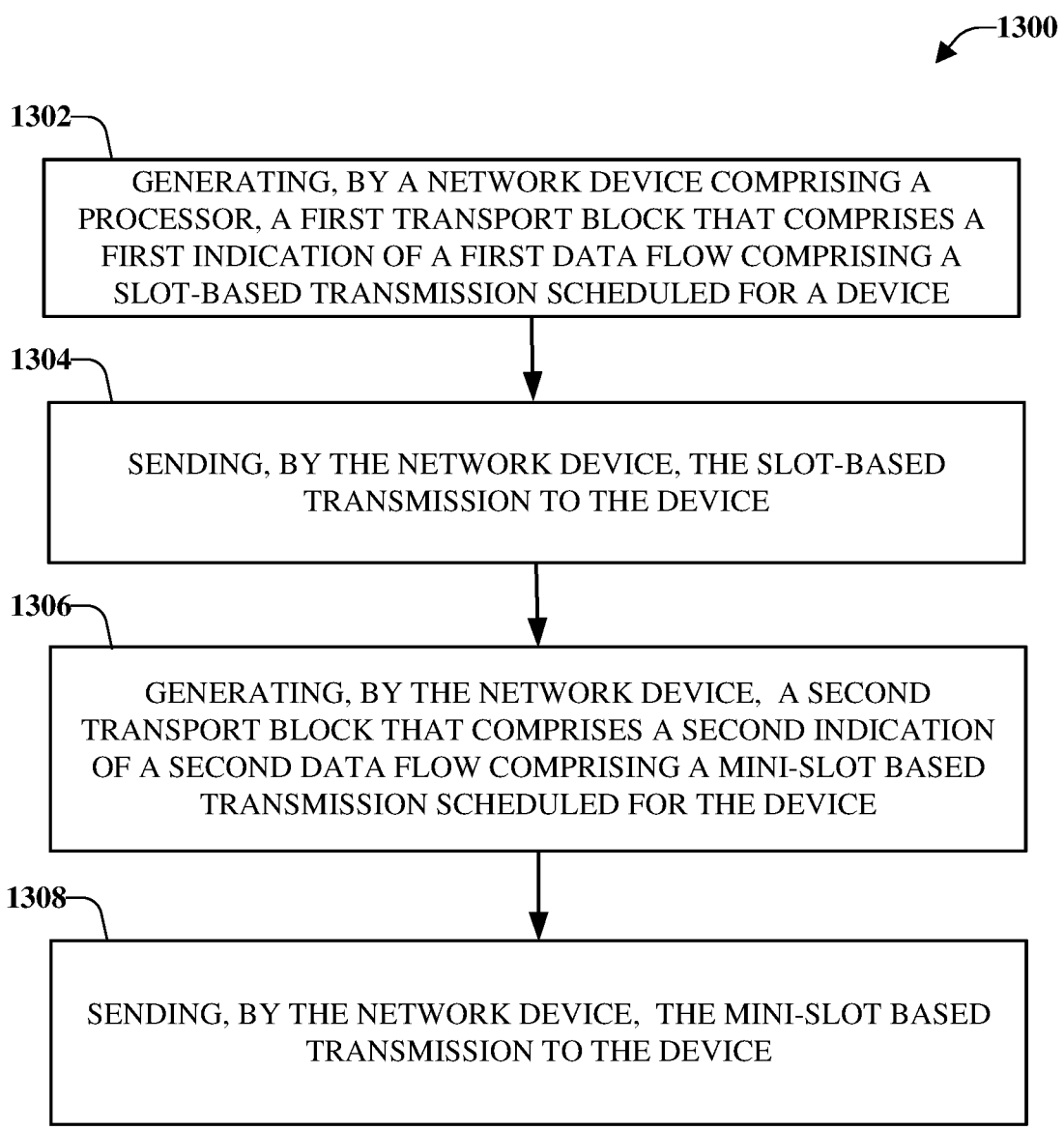
FIG. 13 illustrates a flow diagram of an example, non-limiting computer-implemented method for facilitating transmission of concurrent slot based and mini-slot based transmissions to a single mobile device in accordance with one or more embodiments described herein.

FIG. 13 illustrates a flow diagram of an example, non-limiting computer-implemented method 1300 for facilitating transmission of concurrent slot based and mini-slot based transmissions to a single mobile device in accordance with one or more embodiments described herein. At 1302, a network device comprising a processor can generate a first transport block that comprises a first indication of a first data flow comprising a slot based transmission scheduled for a device. In an example, the first transport block can be generated from first logical channels scheduled for the slot based transmission. At 1304, the slot based transmission can be sent, by the network device, to the device.

At 1306, the network device can generate a second transport block that comprises a second indication of a second data flow comprising a mini-slot based transmission scheduled for the device. In an example, the second transport block can be generated from second logical channels scheduled for the mini-slot based transmission. At 1308, the mini-slot based transmission can be sent, by the network device, to the device.

According to an implementation, a first length of slot based transmission can comprise a defined number of symbols and a second length of the mini-slot based transmission can comprise a group of the defined number of symbols. In accordance with some implementations, the slot based transmission can comprise latency supportable data and the mini-slot based transmission can comprise latency sensitive data. Further to this implementation, the slot based transmission and the mini-slot based transmission can be scheduled to be concurrent transmissions to the device.

According to some implementations, the method 1300 can include scheduling, by the network device, first frequency resource elements for the slot based transmission within a time slot interval. Further to these implementations, the method 1300 can include scheduling, by the network device, second frequency resource elements for the mini-slot based transmission within the time slot interval. The first frequency resource elements and the second frequency resource elements can be non-overlapping frequency resources.

As discussed, the various aspects provided herein can enable concurrent transmission of mini-slot and slot transmissions to the same mobile device. According to an aspect, provided is concurrent scheduling of mini-slot and slot transmissions to the same mobile device, thereby allowing the transmission of very critical low latency data to a mobile device using mini-slots while concurrently transmitting data for other services to the same mobile device using slot transmissions. Further temporary interruption of slot based transmissions to a mobile device can be prevented when mini-slot based transmission to the mobile device is performed. According to another implementation, impact in throughput or delay to other simultaneously configured services that a mobile device might be engaged in while receiving data from a very critical low latency service that uses mini-slot transmissions can be reduced. In addition, the various aspects can be configured for utilization with multiple TRPs.

Figure 14:
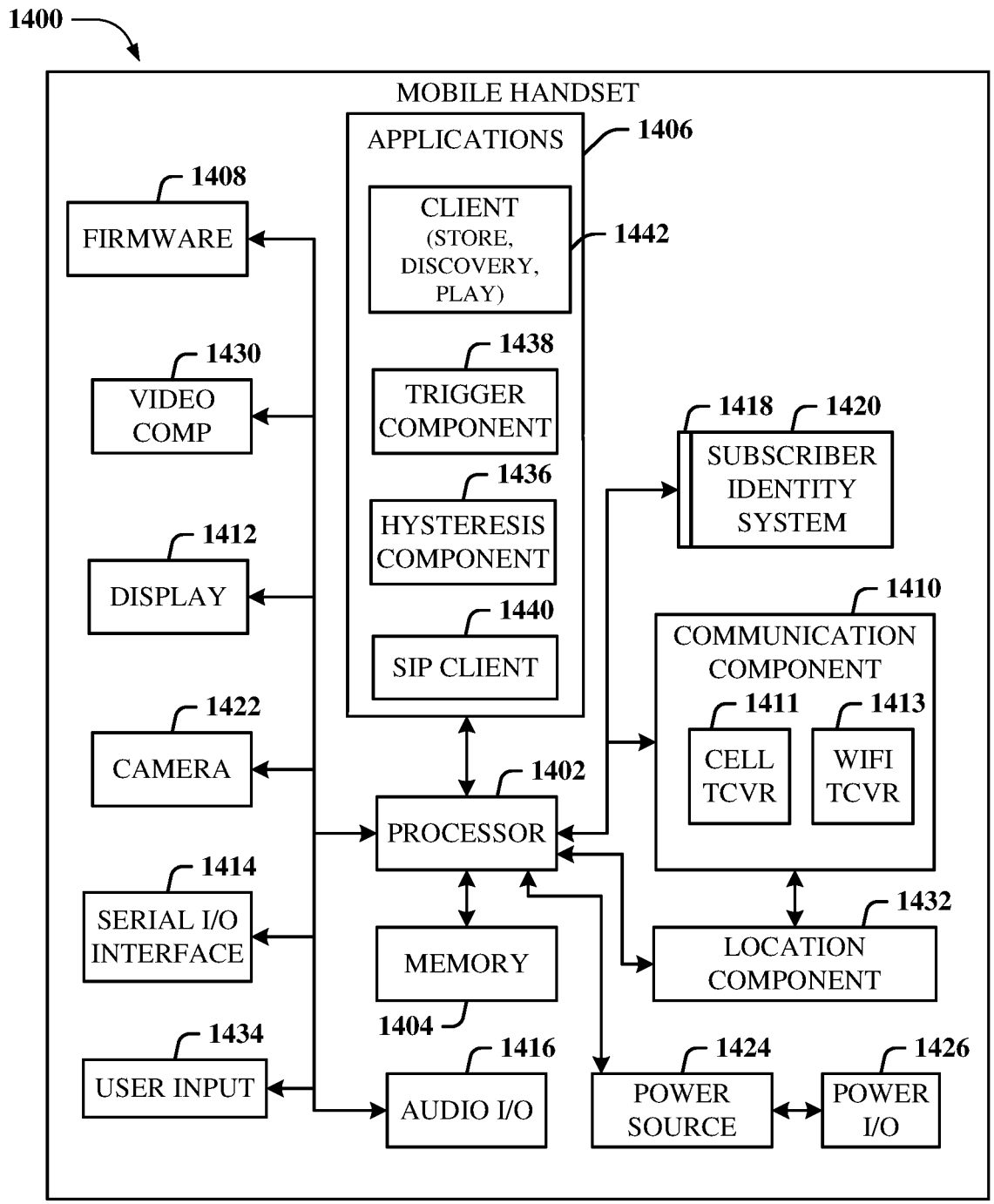
FIG. 14 illustrates an example block diagram of an example mobile handset operable to engage in a system architecture that facilitates wireless communications according to one or more embodiments described herein.

Referring now to FIG. 14, illustrated is a schematic block diagram of an exemplary end-user device such as a mobile device or handset 1400 capable of connecting to a network in accordance with some embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communications component 1410 to accommodate IP traffic from an IP network such as, for example, the Internet, a corporate intranet, a home network, a person area network, etc., through an ISP or broadband cable provider. Thus, VoIP traffic can be utilized by the handset 1400 and IP-based multimedia content can be received in either an encoded or a decoded format.

A video processing component 1422 (e.g., a camera) can be provided for decoding encoded multimedia content. The video processing component 1422 can aid in facilitating the generation, editing and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1436 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 1410, includes an indoor network radio transceiver 1413 (e.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
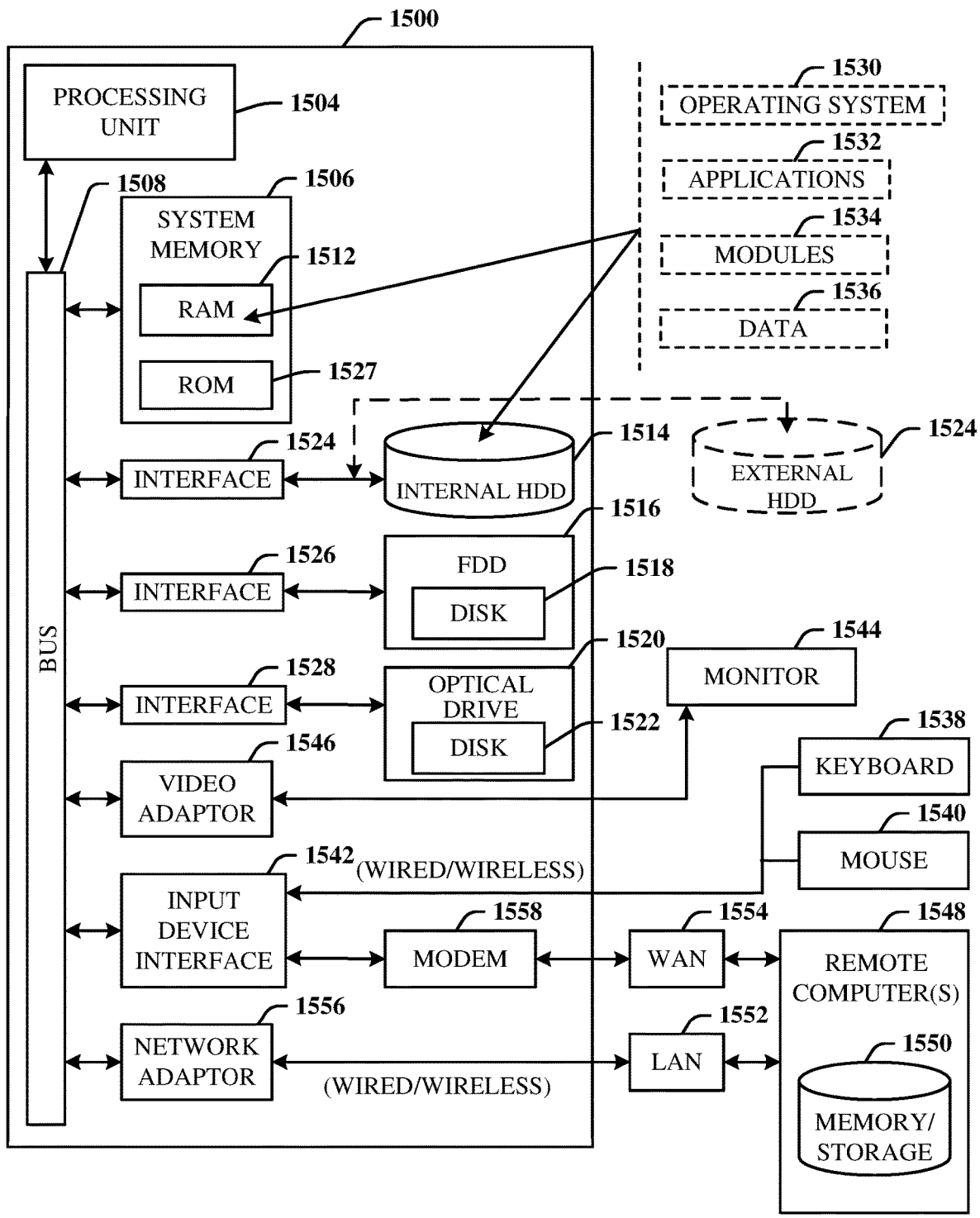
FIG. 15 illustrates an example block diagram of an example computer operable to engage in a system architecture that facilitates wireless communications according to one or more embodiments described herein.

Referring now to FIG. 15, there is illustrated a block diagram of a computer 1500 operable to execute a system architecture that facilitates establishing a transaction between an entity and a third party. The computer 1500 can provide networking and communication capabilities between a wired or wireless communication network and a server (e.g., Microsoft server) and/or communication device. In order to provide additional context for various aspects thereof, FIG. 15 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 15, implementing various aspects described herein with regards to the end-user device can include a computer 1500, the computer 1500 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes read-only memory (ROM) 1527 and random access memory (RAM) 1512. A basic input/output system (BIOS) is stored in a non-volatile memory 1527 such as ROM, EPROM, EEPROM, which BIOS contains the basic routines that help to transfer information between elements within the computer 1500, such as during start-up. The RAM 1512 can also include a high-speed RAM such as static RAM for caching data.

The computer 1500 further includes an internal hard disk drive (HDD) 1514 (e.g., EIDE, SATA), which internal hard disk drive 1514 can also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1500 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1500, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1500 through one or more wired/wireless input devices, e.g., a keyboard 1538 and a pointing device, such as a mouse 1540. Other input devices (not shown) can include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 through an interface, such as a video adapter 1546. In addition to the monitor 1544, a computer 1500 typically includes other peripheral output devices (not shown), such as speakers, printers, etc.

The computer 1500 can operate in a networked environment using logical connections by wired and/or wireless communications to one or more remote computers, such as a remote computer(s) 1548. The remote computer(s) 1548 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1500 is connected to the local network 1552 through a wired and/or wireless communication network interface or adapter 1556. The adapter 1556 can facilitate wired or wireless communication to the LAN 1552, which can also include a wireless access point disposed thereon for communicating with the wireless adapter 1556.

When used in a WAN networking environment, the computer 1500 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 through the input device interface 1542. In a networked environment, program modules depicted relative to the computer, or portions thereof, can be stored in the remote memory/storage device 1550. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As utilized herein, terms "component," "engine," "module," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
generating, by network equipment comprising a processor, a first transport block that comprises a first field that indicates a first data flow scheduled for a slot based transmission for a device;
generating, by the network equipment, a second transport block that comprises a second field that indicates a second data flow scheduled for a mini-slot based transmission for the device; and
facilitating, by the network equipment, transmitting first data that indicates the slot based transmission and second data that indicates the mini-slot based transmission.

2. The method of claim 1, further comprising:
facilitating, by the network equipment, transmitting the slot based transmission and the mini-slot based transmission, wherein the slot based transmission and the mini-slot based transmission are logically separate transmissions that are scheduled to be concurrent transmissions for the device.

3. The method of claim 2, wherein the facilitating of the transmitting of the slot based transmission and the mini-slot based transmission comprises implementing, by the network equipment, the slot based transmission prior to a scheduling of the mini-slot based transmission.

4. The method of claim 2, wherein a first length of the slot based transmission comprises a defined number of symbols and a second length of the mini-slot based transmission comprises some of the defined number of symbols.

5. The method of claim 1, wherein the facilitating of the transmitting of the first data and the second data comprises facilitating the transmitting of the first data via a first control channel and the second data via a second control channel.

6. The method of claim 1, further comprising:
storing, by the network equipment, a frequency resource corresponding to the slot based transmission; and
processing, by the network equipment, the mini-slot based transmission based on a determination that the device comprises a single receiver chain, wherein the processing of the mini-slot based transmission is prior to the slot based transmission being processed during a defined time slot interval.

7. The method of claim 1, wherein the generating of the first transport block and the second transport block comprises generating the first transport block from first logical channels scheduled for the slot based transmission and the second transport block from second logical channels scheduled for the mini-slot based transmission.

8. The method of claim 1, wherein the mini-slot based transmission preempts a symbol of the slot based transmission.

9. A system, comprising:
a processor; and
a memory that stores executable instructions that, when executed by the processor, facilitate performance of operations, comprising:
transmitting first data that indicates a slot based transmission for a device and second data that indicates a mini-slot based transmission for the device;
storing a frequency resource corresponding to the slot based transmission; and
processing the mini-slot based transmission based on a determination that the device comprises a single receiver chain, wherein the processing the mini-slot based transmission is prior to the slot based transmission being processed during a defined time slot interval.

10. The system of claim 9, wherein the operations further comprise:
transmitting the slot based transmission and the mini-slot based transmission, wherein the slot based transmission and the mini-slot based transmission are logically separate transmissions that are scheduled to be concurrent transmissions for the device.

11. The system of claim 9, wherein the operations further comprise:
generating a first transport block that comprises a first indication of a first data flow comprising the slot based transmission and a second transport block that comprises a second indication of a second data flow comprising the mini-slot based transmission.

12. The system of claim 11, wherein the operations further comprise:
generating the first transport block from first logical channels scheduled for the slot based transmission; and
generating the second transport block from second logical channels scheduled for the mini-slot based transmission.

13. The system of claim 11, wherein the mini-slot based transmission is configured to preempt the slot based transmission in a same physical resource block.

14. The system of claim 11, wherein the slot based transmission is transmitted by first network equipment, and wherein the mini-slot based transmission is transmitted by second network equipment.

15. The system of claim 14, wherein the slot based transmission and the mini-slot based transmission comprise respective over-the-air control information exchanged between the first network equipment and the second network equipment.

16. The system of claim 11, wherein the operations further comprise dividing frequency resources in a symbol between the slot based transmission and the mini-slot based transmission.

17. A non-transitory machine-readable medium, comprising executable instructions that, when executed by a processor, facilitate performance of operations, comprising:
generating a first transport block and a second transport block, wherein the first transport block comprises a first field that indicates a first data flow for a slot based transmission scheduled for a device, and wherein the second transport block comprises a second field that indicates a second data flow of a mini-slot based transmission scheduled for the device; and
sending the slot based transmission and the mini-slot based transmission to the device, wherein the slot based transmission and the mini-slot based transmission are logically separate transmissions that are scheduled to be concurrent transmissions for the device.

18. The non-transitory machine-readable medium of claim 17, wherein the operations further comprise processing the mini-slot based transmission based on a determination that the device comprises a single receiver chain, and wherein the processing of the mini-slot based transmission is prior to the slot based transmission being processed during a defined time slot interval.

19. The non-transitory machine-readable medium of claim 17, wherein the operations further comprise generating the first transport block from first logical channels scheduled for the slot based transmission and the second transport block from second logical channels scheduled for the mini-slot based transmission.

20. The non-transitory machine-readable medium of claim 17, wherein the mini-slot based transmission is configured to override a symbol of the slot based transmission.

* * * * *